3,045,420
LUBRICATION SYSTEMS AND PROTECTIVE CONTROLS FOR TURBOCHARGED ENGINES

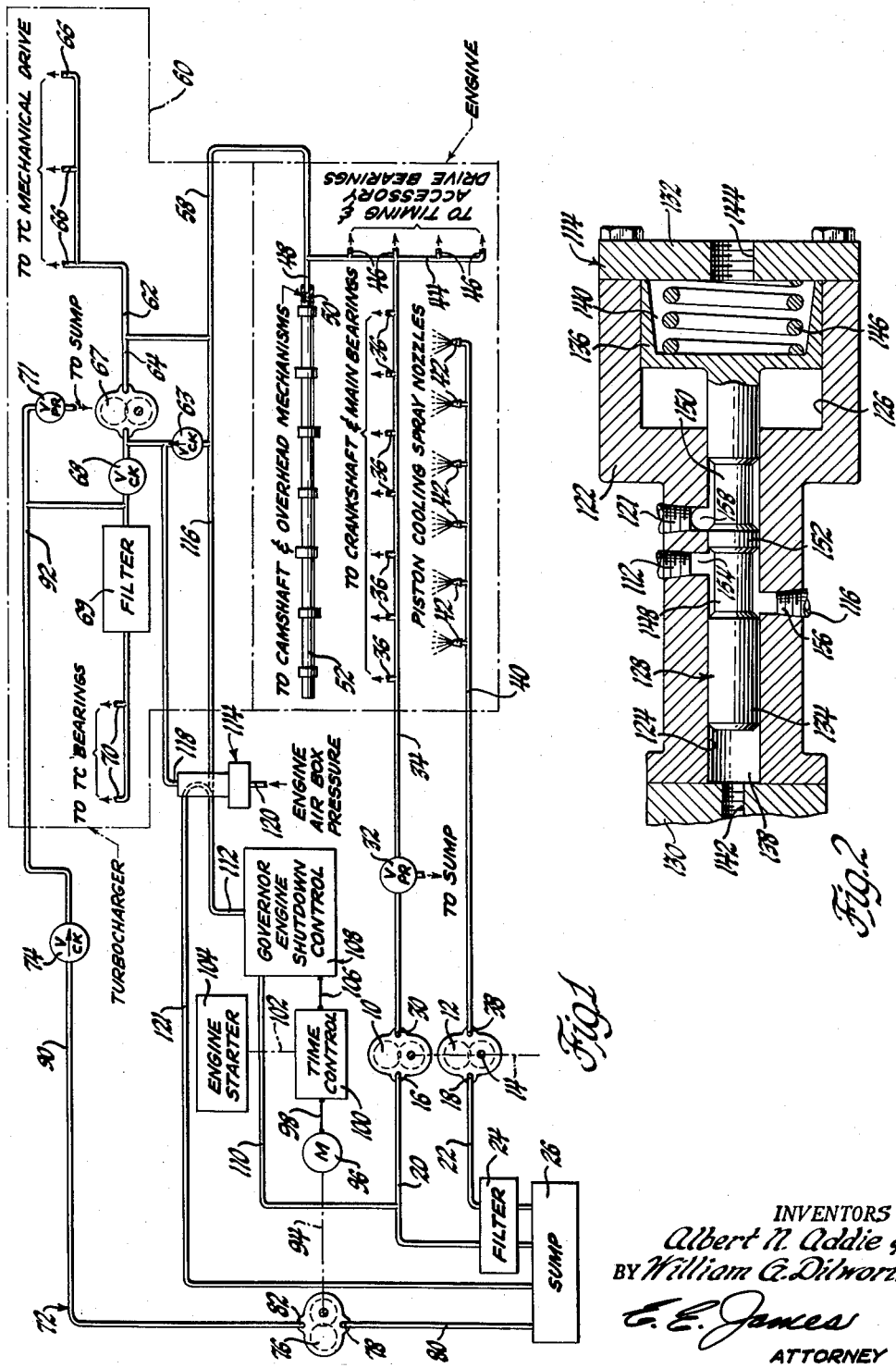

Albert N. Addie, La Grange Park, and William G. Dilworth, La Grange, Ill., assignors to General Motors Corporation, Detroit, Mich., a corporation of Delaware
Filed May 18, 1961, Ser. No. 110,971
6 Claims. (Cl. 60—13)

This invention relates generally to an internal combustion engine, and more particularly to a lubrication and protective control system for a turbocharged engine.

The invention has particular application to the turbocharging of a compression ignition engine of a size adapted to provide continuous locomotive, marine and industrial power requirements. Relatively high mechanical and thermal loads are imposed on the various load carrying and combustion chamber defining components of such a turbocharged engine. Requisite operational durability often dictates the redesign of such components of the previously non-turbocharged engine and requires maintenance of adequate oil supply pressures for both engine and turbocharger lubrication and cooling under all engine speed and load conditions.

The invention contemplates an improved lubrication system for a turbocharged engine of the type indicated including several pumps separately supplying oil for engine and turbocharger lubrication and for piston cooling purposes and related protective controls operable to effect engine shutdown in response to a drop in any of the several oil supply pressures below that required to insure the maintenance of adequate engine and turbocharger lubrication and cooling under any given engine operating condition.

The foregoing and other objects, advantages and features of the invention will be more thoroughly understood from the following description of a preferred illustrative embodiment thereof, having reference to the accompanying drawing, in which:

FIGURE 1 is a diagrammatic view of an engine lubricating and protective control system constructed in accordance with the invention; and FIGURE 2 is a sectional view of a differential pressure modulated valve operable to effect an engine shutdown effecting control condition in response to a drop in turbocharger oil pressure below an air box pressure scheduled characteristic which corresponds substantially with changes in the engine speed and load condition.

As shown diagrammatically in FIGURE 1, the engine and turbocharger lubrication system includes two gear pumps 10 and 12 having a common engine driven impeller shaft 14. These pumps respectively supply pressurized oil to separate engine lubrication and piston cooling supply systems. The pumps 10 and 12 have suction or intake ports 16 and 18 connected through conduits 20 and 22 and a high capacity oil filter 24 to the engine oil sump 26. The discharge port 30 of the engine oil pump 10 is connected through a pressure regulating relief valve 32 to the main oil distribution gallery 34 of the engine. This main gallery is connectable through branch passages indicated at 36 to the crankshaft main bearings and oil supply passages.

The discharge port 38 of the piston cooling oil supply pump 12 is directly connected to a distribution gallery or conduit 40 having a plurality of nozzles 42 mounted thereon. These nozzles are adapted to continuously direct a stream or spray of cooling oil into the combustion chamber defining portions of the several engine pistons. Since the pump 12 is directly driven by the engine, the piston cooling effect provided thereby varies substantially in accordance with engine speed.

A timing and accessory drive oil supply gallery 44 intersects the main lubrication supply gallery 34 at its end distal from the pressure supply pump 10. This timing and accessory drive gallery extends vertically of the engine and is connected through branch passages indicated at 46 to the various timing gear and accessory drive bearings. The gallery 44 is suitably connected at its upper end at 48 to the adjacent end of an oil distribution gallery 50 which extends longitudinally of a camshaft 52 and supplies oil for lubrication of the several camshaft bearings and overhead valve mechanisms. The upper end of the timing and accessory drive gallery 44 is also connected through a conduit 58 for oil supply to an engine mounted turbocharger 60.

The turbocharger is preferably of the type shown and described in copending United States patent application Serial No. 776,099 entitled "Compressor Mechanism for Internal Combustion Engines and the Like," filed November 24, 1958, in the names of Albert N. Addie and Brian M. Gallagher. In such a turbocharger, an alternate mechanical drive is adapted to augment the compressor driving torque of an exhaust gas driven turbine to insure an adequate supply of charging and scavenging air under low speed and power and engine accelerating operating conditions. This mechanical drive is drivingly disconnectable from the turbocharger under higher engine speed and load conditions, being overdriven by the turbine through an overrunning clutch or coupling. Oil distribution branch passages 62 and 64 within the turbocharger are connected to the oil supply conduit 58. The branch passage 62 is connectable through passages partially indicated at 66 to the several bearings of the mechanical drive. The branch passage 64 is connected to the inlet port of a second-stage high pressure pump 67 driven off the engine accessory drive gear train. The pump 67 supplies high pressure oil through a two-way check valve 68, a high pressure "fine" oil filter 69 and branch connections partially indicated at 70 to the critical heat exposed bearings of the turbocharger proper. The high oil pressure supplied by the pump 67 is regulated by a suitable pressure relieving valve indicated at 71. A check valve 63 interconnects the engine oil supply conduit 58 with the discharge of the high pressure pump 67 and is operable to bypass this pump to insure some oil supply to the turbocharger bearings if and whenever the turbocharger oil supply drops below the pressure in the conduit 58 for any reason. The filter 69 and the branch connections 70 of the turbocharger are alternatively connectable through the check valve 74 to an auxiliary high pressure oil supply system 72.

The auxiliary oil supply system for the turbocharger is controllable by engine starting and shutdown effecting controls associated with the engine governor and is selectively operable thereby to provide high pressure oil to prelubricate the turbocharger bearings prior to engine starting and for bearing cooling purposes for a limited period of time after engine shutdown. The auxiliary supply system 72 comprises a pump 76 having an inlet port 78 connected by a conduit 80 to the engine oil sump 26 and a discharge port 82 connected through the check valve 74 and interconnecting conduits 90 and 92 to the high pressure connection intermediate the filter 69 and the check valve 68. The pump 76 is drivingly connected as indicated at 94 to an electrical motor 96. The motor 96 is in turn electrically connected at 98 to a time control switch mechanism 100. This switch mechanism is connected at 102 to the engine starting control 104 and at 106 to the engine shutdown control 108 of the engine governor and is selectively operable thereby to energize the auxiliary pump driving motor for a limited period of time sufficient to prelubricate the critical high speed and heat exposed bearings of the turbocharger prior to engine starting and for a second period of time sufficient to prevent destructive soak-back heating of the turbocharger bearings after engine shutdown effecting operation of the governor control. Such prestarting and post shutdown high pressure oil supply is isolated from the main engine oil supply system by the check valve 68 and the high pressure pump 67.

The engine governor and its related shutdown control is preferably of a type similar to that shown and described in copending United States patent application Serial No. 112,887 entitled "Governor Mechanism," filed May 26, 1961, in the name of Lauren L. Johnson. Such a governor mechanism is provided with remote speed setting and engine speed and load regulating servo mechanisms which cooperate to provide constant output load characteristics to each of the governor maintained engine speed settings. The engine protective control associated with such a governor is operable to effect engine shutdown in response to either an excessive suction or a low engine oil pressure signal applied thereto.

In the illustrative embodiment of the invention, the suction of the engine oil pump 10 is applied to the engine shutdown effecting control 108 through a conduit 110 connected to the pump intake 20. The remote engine oil pressure supplied to the turbocharger mechanical drive and high pressure pump is normally applied to the low oil pressure shutdown control of the governor through a connection 112, a differential pressure modulated valve mechanism 114, and a conduit 116 connected to a turbocharger oil supply conduit 58. The valve mechanism 114 is subjected to the turbocharger high pressure oil supply and the turbocharger generated air box pressure at 118 and 120, respectively, and is operable thereby to simulate an engine oil pressure failure by venting the shutdown control connection 112 to the engine sump through a drain connection 121 whenever the turbocharger high pressure supply is below an air box pressure regulated characteristic. This oil pressure characteristic corresponds substantially to that required for adequate lubrication and cooling of the critical turbocharger bearings for any given engine and turbocharger speed and load operating condition. The valve 114 thus modulates the engine shutdown effecting characteristic in accordance with the speed and load of the engine and turbocharger.

As shown in greater detail in FIGURE 2, the control valve 114 includes a housing 122 having a bore 124 and a coaxial counterbore 126 opening from opposite ends thereof. A valve member 128 of stepped diameter is reciprocably mounted within the valve chamber defined by the housing bore and counterbore and by closure plates 130 and 132 secured to opposite ends of the housing 122. The valve member 128 comprises an elongated plunger portion 134 and a large diameter end portion 136. These valve portions are slidably and sealingly mounted within the bore 124 and the counterbore 126, respectively, and cooperate with the housing end plates 130 and 132 to define expansible pressure chambers 138 and 140. The chambers 138 and 140 are connected at 142 and 144 to the turbocharger oil pressure supply and to the engine air box, respectively, and a spring 146 is compressively interposed between the housing end plate 132 and the valve portion 136.

The operative position of the valve member 128 is thus determined by the balance achieved between the turbocharger oil pressure supplied to the chamber 138 and the combined biasing action of the spring 146 and of the engine air box pressure supplied to the chamber 140. The elongated valve portion 134 has two reduced diameter land portions 148 and 150 which are spaced and separated by a seal land 152. The reduced diameter lands 148 and 150 alternately connect spaced valve housing ports 156 and 158 with an intermediate port 154. The port 154 is connected to the governor shutdown control connection 112. The port 156 is connected to the remote engine oil supply connection 116 and the port 158 is connected to the pressure venting drain 121. The operation of the shutdown control valve thus renders the governor shutdown control effective to shut the engine down whenever the engine oil supply pressure drops below a minimum pressure required for safe engine idle operation or whenever the turbocharger oil supply pressure drops below the scheduled high pressure minimum characteristic corresponding to the engine air box pressure applied thereto.

From the foregoing description, it will be seen that the lubrication and protective control system of the invention insures adequate prelubrication of the critical turbocharger bearings prior to engine starting; insures adequate oil supply pressures for proper engine lubrication, for turbocharger lubrication and cooling, and for piston cooling purposes under all engine speed and load operating conditions; and automatically provides adequate cooling oil to prevent soak-back heating of the critical turbocharger bearings for a timed period subsequent to and in response to operation of the engine shutdown effecting control.

While the invention has been shown and described herein with reference to a single illustrative embodiment, it will be apparent that various changes and departures might be made therefrom without departing from the spirit and scope of the invention as defined in the following claims.

We claim:

1. In a power plant including an internal combustion engine and an exhaust gas driven turbocharger operable to supply pressurized air for charging said engine, a first means operable to supply pressurized oil for engine lubrication, a second means operable to supply pressurized oil for lubrication and cooling of the turbocharger, engine control means operable to effect engine shutdown in response to oil pressure below a minimum pressure required for adequate engine lubrication, and valve means including a valve member having a small diameter end subjected to the oil pressure from said second supply means and a large diameter piston on the opposite end thereof subjected to the pressurized air from said turbocharger, said valve member being shiftable by the differential pressures applied to said opposite ends and cooperating with the remainder of said valve means to connect said first pressure supply means to said pressure responsive means whenever the turbocharger oil pressure is sufficient to insure adequate turbocharger lubrication for the engine and turbocharger load condition indicated by the turbocharger supplied air pressure, said valve member and means being alternately operable to vent said pressure responsive means to effect engine shutdown whenever said turbocharger oil pressure is below that required for adequate turbocharger lubrication as indicated by the turbocharger air pressure.

2. In a power plant including an internal combustion engine and an exhaust gas driven turbocharger operable to supply pressurized air for charging said engine, a first means operable to supply pressurized oil for engine lubrication, a second means operable to supply pressurized oil for lubrication and cooling of the turbocharger, engine control means operable to effect engine shutdown in response to oil pressure below that required for adequate engine lubrication, and differential pressure actuated valve means subjected to the turbocharger supplied oil pressure and to the pressurized air from said turbocharger, said valve means being shiftable by the differential pressures applied thereto and normally operable to connect said first pressure supply means to said pressure responsive means whenever the turbocharger oil pressure is sufficient to insure adequate turbocharger lubrication in accordance with the engine and turbocharger load condition indicated by the turbocharger supplied air pressure, said valve means being alternately operable to vent said pressure responsive means to effect engine shutdown whenever said turbocharger oil pressure is below that required for adequate turbocharger lubrication as indicated by the turbocharger supplied air pressure.

3. A lubrication protective control for a power plant including an internal combustion engine and an exhaust gas driven turbocharger operable to supply pressurized air from charging said engine, means operable to supply pressurized oil for lubrication and cooling of the turbocharger, engine control means operable to effect engine shutdown in response to oil pressure below a minimum pressure, and differential pressure actuated valve means subjected to the turbocharger supplied oil pressure and to the pressurized air from said turbocharger, said valve means being shiftable by the differential pressures applied thereto and normally operable to connect said pressure responsive means to an engine maintaining, oil pressure supply whenever the turbocharger oil pressure exceeds that required for adequate turbocharger lubrication according to the power plant load condition indicated by the turbocharger supplied air pressure, and said valve means being alternately operable to vent said pressure responsive control means to effect engine shutdown whenever said turbocharger pressure is below that required for adequate turbocharger lubrication as indicated by the turbocharger supplied air pressure.

4. In an internal combustion engine power plant including an exhaust gas driven turbocharger for supplying pressurized charging air to the engine, a lubrication and protective control system comprising engine control means normally operable to initiate and maintain engine operation and including pressure responsive means operable to effect engine shutdown in response to an oil pressure signal supplied thereto below a predetermined minimum pressure, a first means operable to supply pressurized oil for engine lubrication, a second means connected in series with said first pressure supply means and operable to further pressurize the oil supplied thereto for lubrication and cooling of the turbocharger, and a differential pressure actuated valve means intermediate said first pressure supply means and said pressure responsive shutdown control means, said valve means including a valve member having a small diameter end subjected to the high pressure oil of said second supply means, a large diameter piston on the opposite end thereof subjected to the pressurized air from said turbocharger, and a spring means biasing said valve member in opposition to said high pressure oil, said valve member being shiftable by the differential pressures applied to the opposite ends thereof and normally cooperating with the remainder of said valve means to connect said first pressure supply means to said pressure responsive means whenever the turbocharger oil supply pressure exceeds that required for adequate turbocharger lubrication for the engine and turbocharger load condition indicated by the turbocharger supplied air pressure, said valve member and means being alternately operable to vent said pressure responsive means to effect engine shutdown whenever said turbocharger oil pressure is below that required for adequate turbocharger lubrication as indicated by the turbocharger air pressure.

5. In an internal combustion engine power plant including an exhaust gas driven turbocharger for supplying pressurized charging air to the engine, a lubrication and protective control system comprising engine control means normally operable to initiate and maintain engine operation and including pressure responsive means operable to effect engine shutdown in response to an oil pressure signal supplied thereto below a predetermined minimum pressure, a first means operable to supply pressurized oil for engine lubrication including a first engine driven pump means and passage means for distributing the pressurized oil from said first pump means to the several engine and accessory bearings, a second means in series with said first pressure supply passage means and operable to pressurize further the oil supplied thereto for lubrication and cooling of the turbocharger, said second pressure supply means including a second engine driven pump means and passage means for distributing the high pressure oil from said second pump means to the several turbocharger bearings, a first valve means operable to prevent reverse fluid flow from said turbocharger bearings toward said second pressure supply means, a second valve means intermediate said first and second passage means and operable to bypass said second pump means when the oil pressure of said turbocharger supply is below that of said engine oil supply and to prevent reverse flow therethrough when said turbocharger oil supply pressure is above that of the engine supply, and a differential pressure actuated valve means connected intermediate said first pressure supply passage means and said pressure responsive shutdown control means, said differential valve means including a valve member having a small diameter end connected to the high pressure oil supply of said second passage means, a large diameter piston on the opposite end of said valve member subjected to the pressurized air from said turbocharger and a spring means biasing said valve member in opposition to said high pressure oil, said valve member being shiftable by the differential pressures applied to the opposite ends thereof and normally cooperating with the remainder of said valve means to connect said first pressure supply passage means to said pressure responsive shutdown means whenever the turbocharger oil supply pressure exceeds that required for adequate turbocharger lubrication according to the engine and turbocharger load condition indicated by the turbocharger supplied air pressure, said valve member and means being alternately operable to vent said pressure responsive means to effect engine shutdown whenever said turbocharger oil pressure is below that required for adequate turbocharger lubrication as indicated by the turbocharger air pressure.

6. In a power plant as set forth in claim 5, a third pressure supply pump means connectable to said turbocharger bearing supply passage means and energizable to supply pressurized oil to the turbocharger bearings independently of engine operation, time control means operably connected to said engine control means to energize said third pump means for limited prelubrication of the turbocharger bearings prior to engine starting and for turbocharger bearing cooling subsequent to engine shutdown.

No references cited.